(12) United States Patent
Nakamura

(10) Patent No.: US 6,836,074 B2
(45) Date of Patent: Dec. 28, 2004

(54) ORGANIC ELECTRO-LUMINESCENCE DISPLAY DRIVING SYSTEM AND MOBILE COMMUNICATION TERMINAL USED THIS SYSTEM

(75) Inventor: Masafumi Nakamura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/020,743

(22) Filed: Dec. 12, 2001

(65) Prior Publication Data

US 2002/0101175 A1 Aug. 1, 2002

(30) Foreign Application Priority Data

Dec. 20, 2000 (JP) .................................. 2000-387485

(51) Int. Cl.[7] .............................................. G09G 3/10
(52) U.S. Cl. .......................... 315/169.3; 315/169.1; 315/149; 315/291; 315/308
(58) Field of Search ................ 315/169.3, 149–159, 315/291, 292, 293, 307, 308, 309, 169.1

(56) References Cited

U.S. PATENT DOCUMENTS

| | | | |
|---|---|---|---|
| 5,089,748 A | 2/1992 | Ihms | |
| 6,144,165 A | 11/2000 | Liedenbaum | |
| 6,265,833 B1 | 7/2001 | Kim et al. | |
| 6,486,853 B2 * | 11/2002 | Yoshinomoto et al. | 343/895 |
| 6,489,638 B2 * | 12/2002 | Seo et al. | 257/98 |

| | | | |
|---|---|---|---|
| 2002/0044782 A1 | 4/2002 | Kota et al. | |

FOREIGN PATENT DOCUMENTS

| | | |
|---|---|---|
| CN | 1256478 A | 6/2000 |
| EP | 1117085 | 7/2001 |
| GB | 2199439 | 7/1988 |
| JP | 58-156257 | 9/1983 |
| JP | 2000-12215 | 1/2000 |
| JP | 2001/176659 | 6/2001 |

OTHER PUBLICATIONS

Copy of The People's Republic of China Office Action dated Jun. 27, 2003 (and English translation of same).
EP Search Report dated Jul. 25, 2002.

* cited by examiner

Primary Examiner—Haissa Philogene
(74) Attorney, Agent, or Firm—Dickstein, Shapiro, Morin & Oshinsky, LLP.

(57) ABSTRACT

An organic EL display driving system and a mobile communication terminal used this system, in which the power consumption of the organic EL display is reduced without damaging the visuality of the displaying contents on the organic EL display, are provided. The organic EL display driving system provides a measuring means that measures the amount of incident light to an organic EL display, which emits light spontaneously, from the outside, and a power supply voltage controlling means that controls the power supply voltage for the organic EL display so that the power supply voltage is increased when the amount of the incident light is large, and the power supply voltage is decreased when the amount of the incident light is small.

10 Claims, 3 Drawing Sheets

ORGANIC ELECTRO-LUMINESCENCE DISPLAY DRIVING SYSTEM AND MOBILE COMMUNICATION TERMINAL USED THIS SYSTEM

BACKGROUND OF THE INVENTION

The present invention relates to an organic electro-luminescence (EL) display driving system and a mobile communication terminal used this system.

DESCRIPTION OF THE RELATED ART

As a display of a mobile communication terminal, mainly a liquid crystal display (LCD) has been used. However, the LCD has several problems. For example, the LCD needs a backlight, and its viewing angle from a user is narrow, and it is not suitable to display moving images, because its response speed is slow. On the other hand, an organic EL display does not need the backlight, because it emits light spontaneously, and its viewing angle from a user is wide, and it is suitable to display moving images, because its response speed is fast. Therefore, this organic EL display has been focused on.

However, in case that the organic EL display is used as the display of the mobile communication terminal, the organic EL display needs a far higher voltage than a voltage being currently used at the mobile communication terminal. Consequently, this high voltage is obtained by using a step-up type DC/DC converter. And as mentioned above, the organic EL display is a spontaneous light emitting element, and when displaying contents on the organic EL display are viewed under intense outside light, the displaying contents on the organic EL display must be displayed with high brightness. As a result, a large amount of electric power needs to be supplied to the mobile communication terminal. However, at the mobile communication terminal, the power is supplied from a power source whose capacity is limited, such as from a battery, consequently, when its power consumption becomes large, there is a problem that the time, which the mobile communication terminal can be used, becomes short.

SUMMARY OF THE INVENTION

It is therefore an object of the present invention to provide an organic EL display driving system and a mobile communication terminal used this system, in which the electric power consuming by the organic EL display can be reduced without damaging the visuality of displaying contents.

According to a first aspect of the present invention, for achieving the object mentioned above, there is provided an organic electro-luminescence (EL) display driving system. The organic EL display driving system provides a measuring means that measures the amount of incident light to an organic EL display, which emits light spontaneously, from the outside, and a power supply voltage controlling means that controls the power supply voltage for the organic EL display so that the power supply voltage is increased when the amount of the incident light is large, and the power supply voltage is decreased when the amount of the incident light is small.

According to a second aspect of the present invention, in the first aspect, the power supply voltage controlling means changes the power supply voltage for the organic EL display in proportion to the amount of the incident light.

According to a third aspect of the present invention, in the second aspect, the organic EL display driving system further provides a means which a user changes a proportional constant between the amount of the incident light and the power supply voltage for the organic EL display by an operation of the user.

According to a fourth aspect of the present invention, in the first aspect, the organic EL display driving system further provides a means for changing the offset of the power supply voltage corresponding to an operation by a user.

According to a fifth aspect of the present invention, in the first aspect, the organic EL display driving system further provides a means for changing the power supply voltage for the organic EL display by an operation of a user, regardless of the power supply voltage decided by the power supply controlling means.

According to a sixth aspect of the present invention, there is provided a mobile communication terminal. The mobile communication terminal provides the organic EL display driving system mentioned above.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENT

At the embodiment of the present invention, an organic EL display driving system, and a mobile communication terminal used this system, in which the power consumption of the mobile communication terminal used an organic EL display can be reduced, are explained. The organic EL display driving system mainly provides an organic EL display as a display of the mobile communication terminal, a power supply for organic EL display, an optical sensor disposed on the surface surrounding and near the organic EL display, an analog to digital converter (ADC) that converts an analog voltage generated at the optical sensor into a digital voltage, and a voltage controller that controls the power supply for organic EL display based on the voltage outputted from the ADC.

And at this organic EL display driving system, the brightness of the organic EL display of the mobile communication terminal is controlled corresponding to the amount of the light from the outside, measured at the optical sensor. And the power consumption of the mobile communication terminal is reduced by lowering the brightness of the organic EL display as much as possible within a level that a user can recognize the displaying contents.

Figure 1:
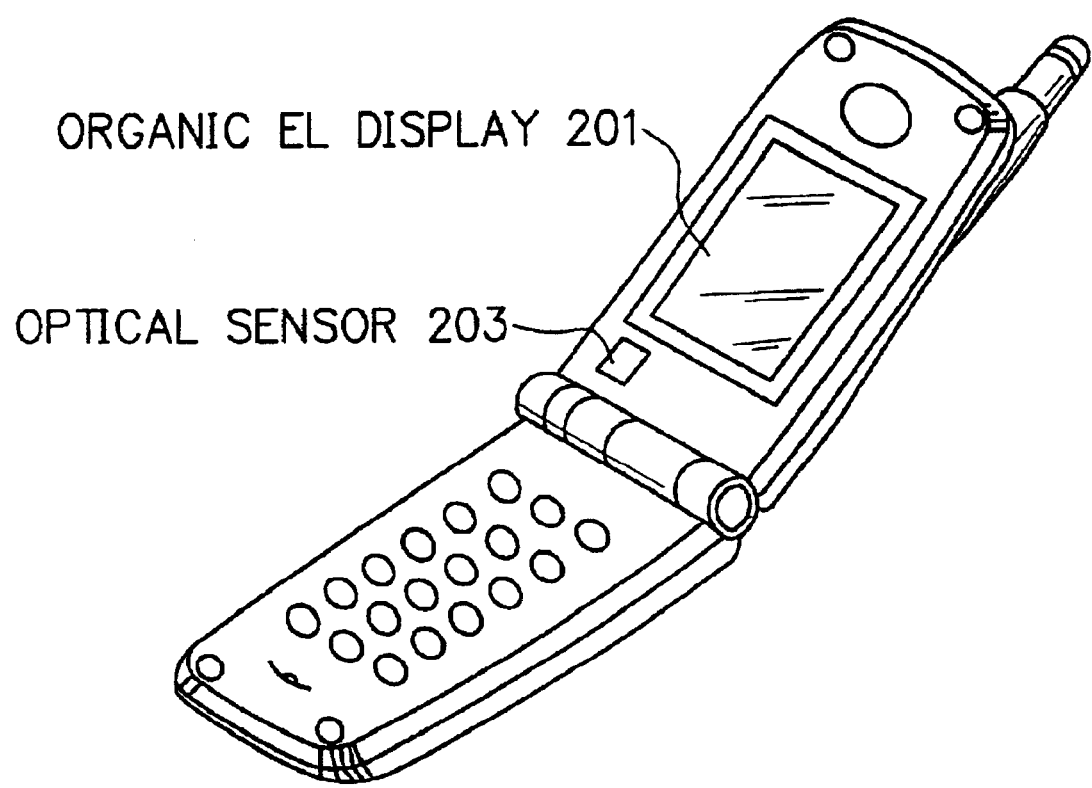
FIG. 1 is a perspective view of a mobile communication terminal used an organic EL display and an organic EL display driving system at a embodiment of the present invention.

Referring now to the drawings, an embodiment of the present invention is explained in detail. FIG. 1 is a perspective view of a mobile communication terminal used an organic EL display and an organic EL display driving system at the embodiment of the present invention. As shown in FIG. 1, the mobile communication terminal uses an organic EL display 201 as its display. This organic EL display 201 is a spontaneous light emitting element, and when the amount of the light from the outside is large, the brightness of the organic EL display 201 needs to be brighter, but, for example, at a dim room, the displaying contents on the organic EL display 201 can be recognized by a user even when its brightness is low. And as shown in FIG. 1, an optical sensor 203 is disposed on the surface surrounding and near the organic EL display 201. And the brightness of the organic EL display 201 is lowered within a level that a user can recognize the displaying contents, based on the measured result at the optical sensor 203, and the power consumption of the mobile communication terminal is reduced.

Figure 2:
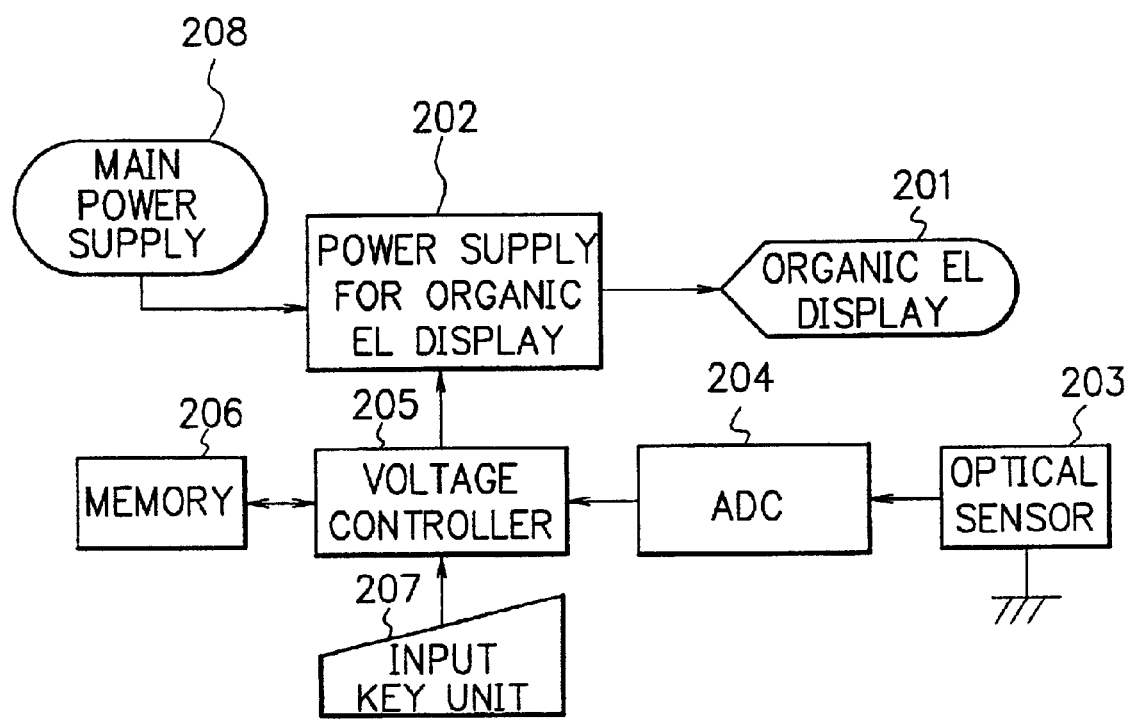
FIG. 2 is a block diagram showing a structure of the organic EL display driving system at the embodiment of the present invention.

FIG. 2 is a block diagram showing a structure of the organic EL display driving system at the embodiment of the present invention. As shown in FIG. 2, the organic EL display driving system at the embodiment of the present invention consists of the organic EL display 201, a power supply for organic EL display 202, the optical sensor 203, an analog to digital converter (ADC) 204, a voltage controller 205, a memory 206, an input key unit 207, and a main power supply 208.

The organic EL display 201 is a display using for a mobile communication terminal. The power supply for organic EL display 202 supplies a voltage to the organic EL display 201. The optical sensor 203 is disposed on the surface surrounding and near the organic EL display 201, and measures the amount of incident light to the organic EL display 201, by detecting actually proportional to the amount of the incident light to the organic EL display 201 at the optical sensor 203, and outputs an analog voltage corresponding to the amount of the incident light. The ADC 204 converts the analog voltage outputted from the optical sensor 203 into a digital voltage. The voltage controller 205 controls the power supply for organic EL display 202 based on the voltage outputted from the ADC 204 and data storing in the memory 206. The memory 206 stores the data requiring to control the voltage controller 205. The input key unit 207 is used when the user directly controls the brightness of the organic EL display 201 and so on. The main power supply 208, being such as a battery, is the main power supply of the mobile communication terminal and supplies electric power to the power supply for organic EL display 202.

As mentioned above, the organic EL display 201 is the spontaneous light emitting element, and its brightness is changed when a voltage applying to the organic EL display 201 is changed. A DC/DC converter is used as the power supply for organic EL display 202, and the power supply for organic EL display 202 generates a voltage, which the organic EL display 201 needs, from the voltage of the main power supply 208 of the mobile communication terminal. The optical sensor 203 is disposed on the surface surrounding and near the organic EL display 201, and outputs a voltage corresponding to the amount of light that is receiving on the surface of the organic EL display 201. The output from the optical sensor 203 is converted from an analog value to a digital value at the ADC 204, and the converted value is inputted to the voltage controller 205. By using this converted digital value and the data in the memory 206, the brightness of the organic EL display 201 is controlled corresponding to the amount of light receiving at the optical sensor 203.

At the mobile communication terminal used the organic EL display 201 shown in FIG. 1, a higher voltage than that is normally used in the mobile communication terminal is required for the organic EL display 201, therefore, the DC/DC converter is used as the power supply for organic EL display 202 as shown in FIG. 2. The voltage showing the amount of light measured at the optical sensor 203 is converted at the ADC 204, and converted digital voltage is inputted to the voltage controller 205. The voltage controller 205 controls the power supply for organic EL display 202, by using the converted digital voltage and the data being a corresponding table and a conversion equation in the memory 206.

Figure 3:
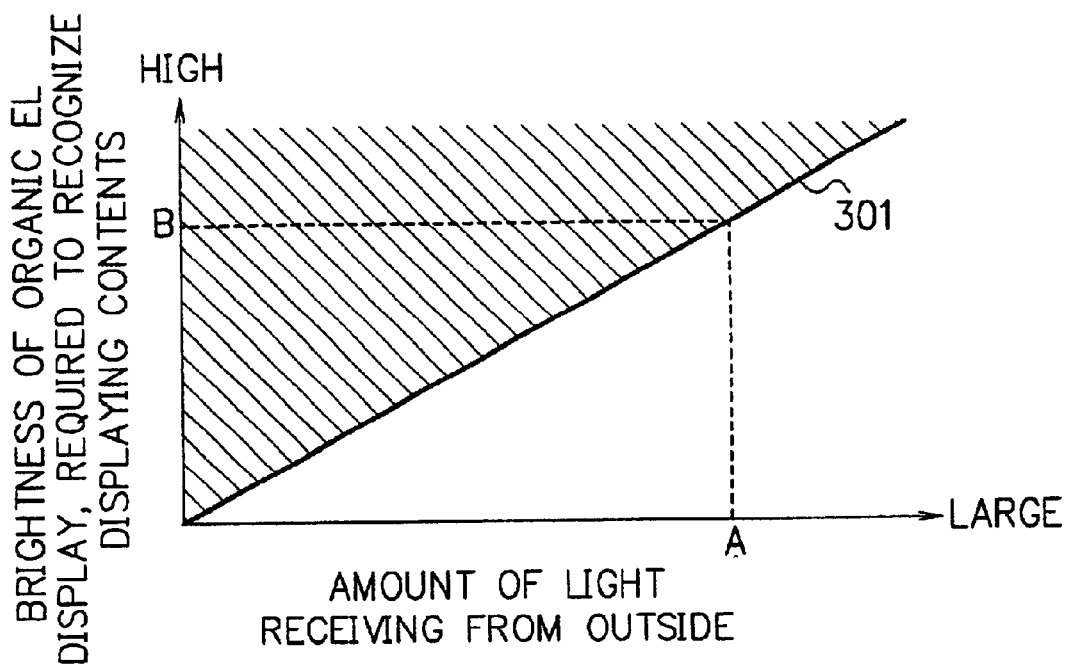
FIG. 3 is a graph showing a relation between the amount of light receiving from the outside and the brightness of the organic EL display, required to recognize the displaying contents, at the embodiment of the present invention.

FIG. 3 is a graph showing a relation between the amount of light receiving from the outside and the brightness of the organic EL display 201, required to recognize the displaying contents, at the embodiment of the present invention. As mentioned above, since the organic EL display 201 is the spontaneous light emitting element, as shown in FIG. 3, in order to recognize the displaying contents on the organic EL display 201, the larger the amount of light received from the outside is, the higher the brightness of the organic EL display 201 is required. In FIG. 3, the region shown by oblique lines shows the region where the displaying contents can be recognized, and the straight line 301 shows the minimum brightness of the organic EL display 201 at each of the amount of light receiving from the outside. In FIG. 3, when the amount of light received from the outside is "A", the brightness of the organic EL display 201, required to recognize the displaying contents on the organic EL display 201, becomes the value "B" or more.

Figure 4:
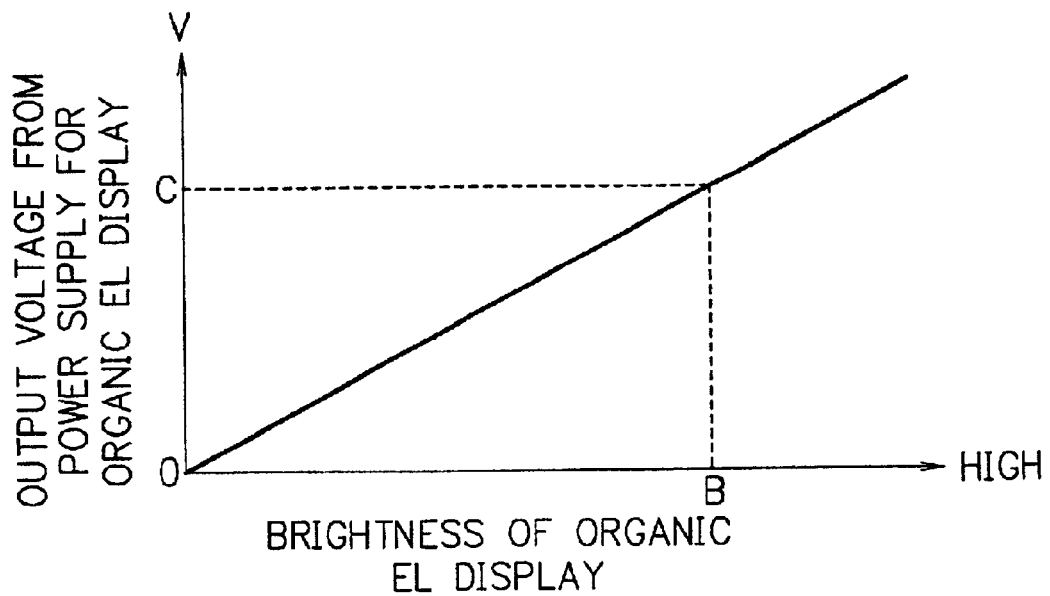
FIG. 4 is a graph showing a relation between the brightness of the organic EL display and the output voltage from a power supply for organic EL display at the embodiment of the present invention.

FIG. 4 is a graph showing a relation between the brightness of the organic EL display 201 and the output voltage from the power supply for organic EL display 202 at the embodiment of the present invention. As shown in FIG. 4, in case that the brightness of the organic EL display 201, required to recognize the displaying contents on the organic EL display 201, is the value "B" or more, the output voltage from the power supply for organic EL display 202 becomes "C" V or more. And the voltage controller 205 uses the converted result of the amount of light received from the outside "A" at the ADC 204 and the data in the memory 206, and controls the power supply for organic EL display 202 so that the power supply for organic EL display 202 supplies a voltage being the voltage "C" V or more and as a small voltage as possible to reduce the power consumption, that is, a voltage almost equal to the voltage "C" V is supplied to the organic EL display 201.

And at the embodiment of the present invention, the brightness of the organic EL display 201, a proportional constant between the amount of light receiving from the outside and the output voltage for the organic EL display 201, and the offset of the power supply voltage for the power supply for organic EL display 202, can be designated by that the user operates the input key unit 207.

At the embodiment of the present invention, one optical sensor 203 is used, however, plural optical sensors 203 can be used. In this case, the plural optical sensors 203 are disposed surrounding the organic EL display 201, and voltages from plural optical sensors 203 are converted at the ADC 204, and the voltage controller 205 controls the voltage of the power supply for organic EL display 202 by averaging the converted plural voltages. With this, more precise voltage control can be executed. Further, as the optical sensor 203, a solar cell can be used.

Conventionally, in case that an organic EL display is used as a display for an mobile communication terminal, the brightness of the organic EL display is always kept in high so that a user can always recognize the displaying contents, supposing that the amount of light receiving from the outside becomes large. However, according to the present invention, the brightness of the organic EL display can be made to be a necessary minimum value, by measuring the amount of light from the outside by using an optical sensor, with this, the power consumption of the mobile communication terminal can be reduced.

While the present invention has been described with reference to the particular illustrative embodiment, it is not to be restricted by that embodiment but only by the appended claims. It is to be appreciated that those skilled in the art can change or modify the embodiment without departing from the scope and spirit of the present invention.

What is claimed is:

1. An organic electro-luminescence (EL) display driving system, comprising:

a measuring means that measures the amount of incident light to an organic EL display, which emits light spontaneously, from the outside; and a power supply voltage controlling means that controls the power supply voltage for said organic EL display so that said power supply voltage is increased when said amount of said incident light is large, and said power supply voltage is decreased when said amount of said incident light is small.

2. The organic EL display driving system in accordance with claim 1, wherein:

said power supply voltage controlling means changes said power supply voltage for said organic EL display in proportion to said amount of said incident light.

3. The organic EL display driving system in accordance with claim 2, further comprising:

a means by which a user changes a proportional constant between said amount of said incident light and said power supply voltage for said organic EL display by an operation of said user.

4. The organic EL display driving system in accordance with claim 1, further comprising:

a means for changing the offset of said power supply voltage corresponding to an operation by a user.

5. The organic EL display driving system in accordance with claim 1, further comprising:

a means for changing said power supply voltage for said organic EL display by an operation of a user, regardless of said power supply voltage decided by said power supply controlling means.

6. A mobile communication terminal, comprising an organic electro-luminescence (EL) display driving system, said display driving system comprising:

a measuring means that measures the amount of incident light to an organic EL display, which emits light spontaneously, from the outside; and a power supply voltage controlling means that controls the power supply voltage for said organic EL display so that said power supply voltage is increased when said amount of said incident light is large, and said power supply voltage is decreased when said amount of said incident light is small.

7. The mobile communication terminal in accordance with claim 6, wherein:

said power supply voltage controlling means changes said power supply voltage for said organic EL display in proportion to said amount of said incident light.

8. The mobile communication terminal in accordance with claim 7, said display driving system further comprising:

a means by which a user changes a proportional constant between said amount of said incident light and said power supply voltage for said organic EL display by an operation of said user.

9. The mobile communication terminal in accordance with claim 8, said display drying system further comprising:

a means for changing the offset of said power supply voltage corresponding to an operation by a user.

10. The mobile communication terminal in accordance with claim 9, said display driving system further comprising:

a means for changing said power supply voltage for said organic EL display by an operation of a user, regardless of said power supply voltage decided by said power supply controlling means.

* * * * *